(12) United States Patent
Mo

(10) Patent No.: US 9,919,200 B2
(45) Date of Patent: Mar. 20, 2018

(54) WEARABLE MOTORIZED DEVICE

(71) Applicant: Tiande Mo, Hong Kong (HK)

(72) Inventor: Tiande Mo, Hong Kong (HK)

( * ) Notice: Subject to any disclaimer, the term of this patent is extended or adjusted under 35 U.S.C. 154(b) by 0 days.

(21) Appl. No.: 15/063,562

(22) Filed: Mar. 8, 2016

(65) Prior Publication Data

US 2017/0259162 A1    Sep. 14, 2017

(51) Int. Cl.

| | | |
|---|---|---|
| *A63C 5/08* | (2006.01) | |
| *A63C 17/12* | (2006.01) | |
| *A63C 17/06* | (2006.01) | |
| *A63C 17/26* | (2006.01) | |
| *A63C 17/22* | (2006.01) | |
| *A63C 17/00* | (2006.01) | |
| *B60K 7/00* | (2006.01) | |
| *A63C 17/24* | (2006.01) | |
| *H02K 1/22* | (2006.01) | |
| *H02K 1/12* | (2006.01) | |
| *H02K 7/08* | (2006.01) | |
| *H02K 11/33* | (2016.01) | |
| *H02K 11/00* | (2016.01) | |
| *H02K 11/21* | (2016.01) | |

(52) U.S. Cl.
CPC .......... *A63C 17/12* (2013.01); *A63C 17/0046* (2013.01); *A63C 17/06* (2013.01); *A63C 17/22* (2013.01); *A63C 17/226* (2013.01); *A63C 17/24* (2013.01); *A63C 17/262* (2013.01); *B60K 7/0007* (2013.01); *H02K 1/12* (2013.01); *H02K 1/22* (2013.01); *H02K 7/08* (2013.01); *H02K 11/0094* (2013.01); *H02K 11/21* (2016.01); *H02K 11/33* (2016.01)

(58) Field of Classification Search
CPC ..... A63C 17/17; A63C 17/262; A63C 17/226; A63C 17/0046; A63C 17/22; A63C 17/06; A63C 17/24; A63C 17/20; A63C 2203/12; A63C 2203/02; A63C 2017/0053; H02K 11/21; H02K 11/33; H02K 11/0094; H02K 1/22; H02K 1/12; H02K 7/08
See application file for complete search history.

(56) References Cited

U.S. PATENT DOCUMENTS

| | | | | |
|---|---|---|---|---|
| 3,476,399 | A * | 11/1969 | Finn ...................... | A63C 17/08 280/11.25 |
| 6,703,742 | B1 * | 3/2004 | Brandley ............ | B60L 11/1807 180/65.51 |
| 6,764,082 | B2 * | 7/2004 | Roderick ............... | A43B 5/005 280/11.19 |

(Continued)

*Primary Examiner* — James M Dolak
(74) *Attorney, Agent, or Firm* — Spruson & Ferguson (HK)

(57) ABSTRACT

A wearable motorized device comprising a shoe bracket, which can be fastened to a shoe; wheels that are installed on the left and right sides of the shoe bracket in parallel to support the wearer's lateral skating and longitudinal walking; a driving motor for rotationally driving the wheels; and a battery pack for powering the driving motor. The wheels are not coaxially installed on the two sides of the shoe bracket to drive the wearer's longitudinal skating, but instead are installed on the two sides of the shoe bracket in parallel to drive the wearer's lateral skating; the wearer can position his/her legs apart during skating, so the skating stability is improved. Its general contour does not significantly exceed the contour of the shoe in the longitudinal direction, thus and it will not strain the wearer when ascending or descending stairs.

17 Claims, 9 Drawing Sheets

(56) References Cited

U.S. PATENT DOCUMENTS

| | | | | |
|---|---|---|---|---|
| 7,138,774 | B2* | 11/2006 | Negoro | A63C 17/0046 |
| | | | | 180/181 |
| 7,198,280 | B2* | 4/2007 | Hara | A63C 17/0033 |
| | | | | 280/29 |
| 7,458,435 | B2* | 12/2008 | Negoro | A63C 17/12 |
| | | | | 180/180 |
| 7,610,972 | B2* | 11/2009 | Adams | A63C 17/008 |
| | | | | 180/180 |
| 7,980,567 | B2* | 7/2011 | Yu | A63C 17/06 |
| | | | | 280/11.12 |
| 8,308,171 | B2* | 11/2012 | Farrelly | A63C 17/01 |
| | | | | 280/11.233 |
| 8,684,121 | B2* | 4/2014 | Treadway | A63C 17/12 |
| | | | | 180/180 |
| 9,764,218 | B2* | 9/2017 | Treadway | A63C 17/0046 |
| 9,776,067 | B2* | 10/2017 | Adams | A43B 5/1633 |
| 9,776,068 | B2* | 10/2017 | Sambeth | A63C 17/24 |
| 2002/0100625 | A1* | 8/2002 | Beltrame | H02K 11/20 |
| | | | | 180/65.51 |
| 2003/0020244 | A1* | 1/2003 | Sung | A63C 17/04 |
| | | | | 280/11.19 |
| 2007/0164521 | A1* | 7/2007 | Robinson | A43B 3/0005 |
| | | | | 280/11.19 |
| 2012/0285756 | A1 | 11/2012 | Treadway | |
| 2014/0158446 | A1 | 6/2014 | Treadway | |
| 2014/0262576 | A1* | 9/2014 | Tuli | A43B 3/0005 |
| | | | | 180/167 |
| 2015/0042101 | A1* | 2/2015 | Luo | H02K 35/02 |
| | | | | 290/1 A |

\* cited by examiner

WEARABLE MOTORIZED DEVICE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent Trademark Office patent file or records, but otherwise reserves all copyright rights whatsoever.

FIELD OF THE INVENTION

The present invention relates to the field of wearable technology, particular to wearable motorized devices.

BACKGROUND

U.S. Patent Application Publication No. 2012/0285756A1 and U.S. Patent Application Publication No. 2014/0158446A1 disclosed a wearable motorized device, which comprises a base for supporting the foot of a person and for holding the battery pack. The base is provided with raised side edges, raised rear edge, and two wheels of at least 5.5 inches in diameter. The two wheels are coaxially connected to the left and right sides of the raised side edges of the base plate. The wheel is having a wheel hub motor, and a motor controller is embedded therein. The base is also provided with a strap, which fastens the wearable motorized device to a shoe.

The wearable motorized device has the following shortcomings: the wearer's stability provided by the wearable motorized device is low due to the longitudinal length added to the wearer's feet, even when the wearer positions both her feet on the ground with one foot in front of the other during skating. This is so because the distance between the two feet with one in front of the other cannot be too large due to the limitation of the human body physique. It would otherwise cause awkwardness and discomfort to the wearer. As the battery pack is secured at the raised rear edge of the base plate, it greatly increases the length of the base, and the general contour of the motorized device far exceeds the contour of the shoe in the longitudinal direction. Thus, the wearer has to turn her feet sideways when ascending and descending stairs, causing awkwardness and inconvenience.

SUMMARY

The present invention provides a wearable motorized device, which overcomes the prior arts' shortcomings of low skating stability and inadequacy in accommodating stair climbing and descending actions.

In accordance to various embodiments of the present invention, a wearable motorized device is provided, which comprises: a shoe bracket, which can be fastened onto a shoe of a wearer; a plurality of wheels, which are connected to the left and right sides of the shoe bracket in parallel to support the wearer's lateral skating and longitudinal walking; a driving motor, which drives the wheels rotationally; and a battery pack, which powers the driving motor.

In accordance to one embodiment of the wearable motorized device, the driving motor is embedded inside one of the wheels, and the battery pack is embedded inside the other one of the wheels. The shoe bracket comprises a plurality of wheel brackets, each securing each of the wheels; and a base plate for supporting the shoe. The base plate is provided with a shock pad for absorption of vibration and shock. The shoe bracket is also provided with a strap, which is used to fasten the shoe bracket to the shoe.

In accordance to one embodiment, the driving motor comprises a rotor, stator, a first stator bracket, a second stator bracket, and a position sensor. The rotor is mounted on the radial outer side of the stator; the stator is fixed onto the first stator bracket and the second stator bracket; the first stator bracket and the second stator bracket are securely connected together by one or more bolts. The driving motor further comprises an inverter, which is installed on the first stator bracket or the second stator bracket.

In accordance to one embodiment, the wheel comprises a wheel rim, tire, a bearing, and a hub cover, the tire is installed on the wheel rim, the rotor is fixed on the inner wall of the wheel rim; the bearing is installed between the wheel rim and the first stator bracket or the second stator bracket. The inner wall of the first stator bracket and the second stator bracket is provided with a first projecting lug, and the first stator bracket and the second stator bracket are securely connected to the wheel bracket when the hub cover is securely connected to the first projecting lug.

In accordance to another embodiment, the battery pack comprises a cylinder, a cylinder cover and a battery, and the battery is installed within the cylinder. The bearing is installed between the wheel rim and the cylinder. The inner wall of the cylinder is provided with a second projecting lug, and the cylinder is securely connected to the wheel bracket when the hub cover is securely connected to the second projecting lug.

In accordance to one embodiment, the section of the tire is arc-shaped.

In accordance to one embodiment, the wearable motorized device further comprises a front heel, which is connected to the shoe bracket to assist the wearer in walking. The front heel is step-shaped and having at least two ground contact areas one near the toe part of the shoe and the other near the wheels. The front heel is made of shoe sole material. The driving motor is installed inside or on the wheel, and the battery pack is installed on the shoe bracket or is worn on the wearer's body. In accordance to another embodiment, both the driving motor and the battery pack are worn on the wearer's body, and the wearable motorized device further comprises a flexible shaft, which is used to transferring the driving force of the driving motor to the wheels.

In accordance to another embodiment, the wheels are not coaxially installed at the two sides of the shoe bracket to drive the wearer's longitudinal skating, but instead are installed at the two sides of the shoe bracket in parallel to drive the wearer's lateral skating. This way, the wearer can position his/her legs apart during skating; such that the skating stability is improved. Moreover, its general contour does not significantly exceed the contour of the shoe in the longitudinal direction, thus it will not strain the wearer when ascending or descending stairs. Therefore, a wearable motorized device with high skating stability and ease of use can be achieved.

BRIEF DESCRIPTION OF THE DRAWINGS

Embodiments of the invention are described in more detail hereinafter with reference to the drawings, in which.

Figure 1:
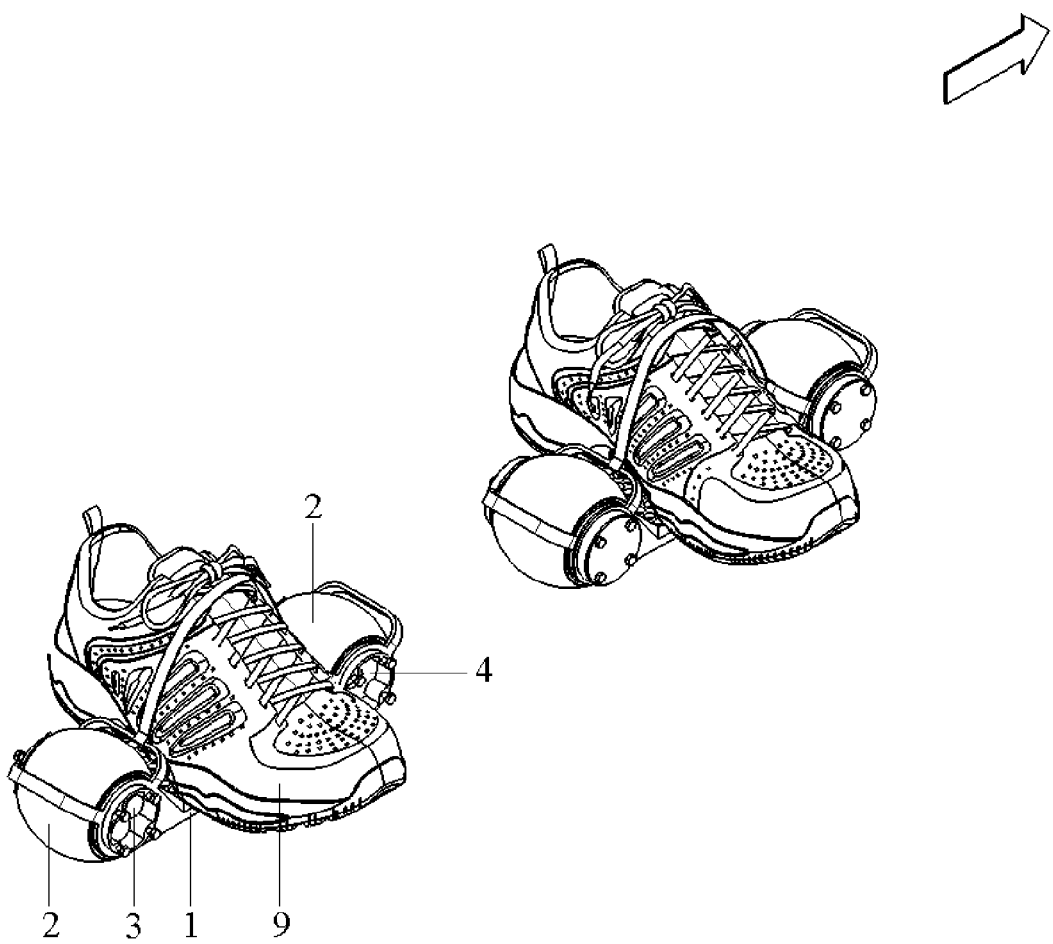
FIG. 1 is the schematic view of the overall structure of the wearable motorized device according to one embodiment of the invention.

As shown in the drawings, reference labels 1, 11, 12, 13, and 14 refer to the shoe rack, the wheel bracket, the base plate, the shock pad, and the strap respectively; 2, 21, 22, 23, 231, 232, and 24 refer to the wheel, the wheel rim, the tire, the bearing, and the hub cover respectively; 3, 31, 32, 331, 332, 333, 34, and 35 refer to the driving motor, the rotor, stator, the first stator bracket, the second stator bracket, the first projecting lug, the position sensor, and the inverter respectively; 4, 41, 411, 42, and 43 refer to the battery pack, the cylinder, the second projecting lug, the battery, and the battery protection board; 5 refers to the front heel; and 9 refers to the shoe.

DETAILED DESCRIPTION

In the following description, designs of wearable motorized devices are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation. It should be understood that the embodiments disclosed herein are intended to illustrate and not to limit the present invention.

FIG. 1 is the structural diagram of the wearable motorized device according to the first embodiment of the invention. Referring to FIG. 1, the wearable motorized device comprises: a shoe bracket 1, which can be fastened to the shoe 9; wheels 2, which are installed on the left and right sides of the shoe bracket 1 in parallel to support the wearer's lateral skating and longitudinal walking; a driving motor 3, which rotationally drives the wheels 2; a battery pack 4, which powers the driving motor 3.

In accordance to the first embodiment, the wheels are not coaxially installed at the two sides of the shoe bracket to drive the wearer's longitudinal skating, but instead are installed at the two sides of the shoe bracket in parallel to drive the wearer's lateral skating. In this way, the wearer can position his/her legs apart during skating, so the skating stability is improved. Moreover, its general contour does not significantly exceed the contour of the shoe in the longitudinal direction, thus will not strain the wearer when ascending or descending stairs. Therefore, a wearable motorized device with high skating stability and ease of use can be achieved.

Figure 2:
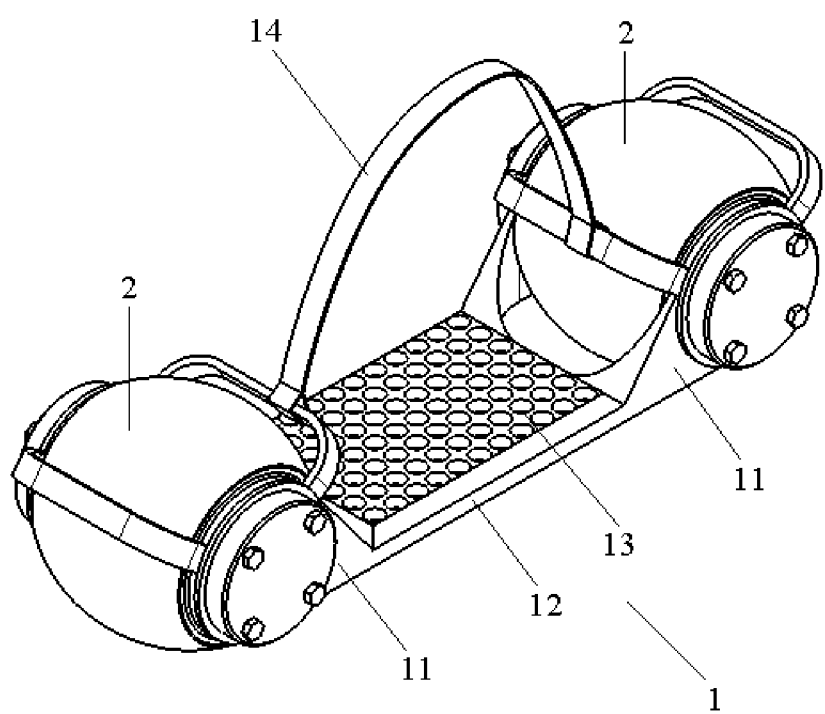
FIG. 2 is the structural diagram of the wearable motorized device according to one embodiment of the invention.
Figure 3:
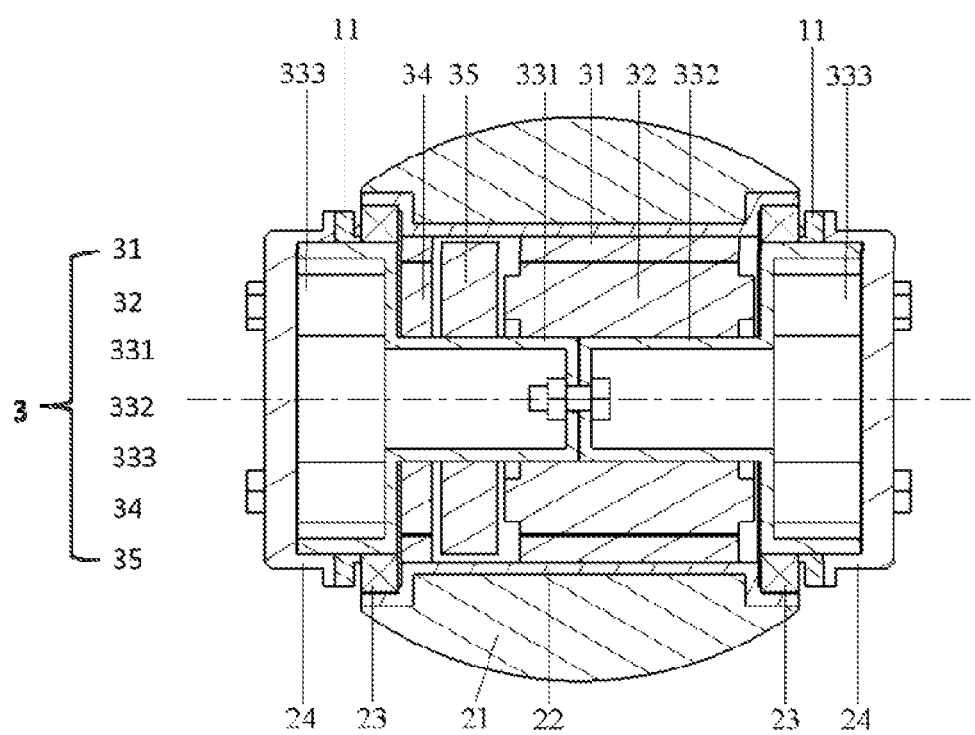
FIG. 3 is the sectional view of the wheel of the wearable motorized device shown in FIG. 2, which is provided with a battery pack.
Figure 4:
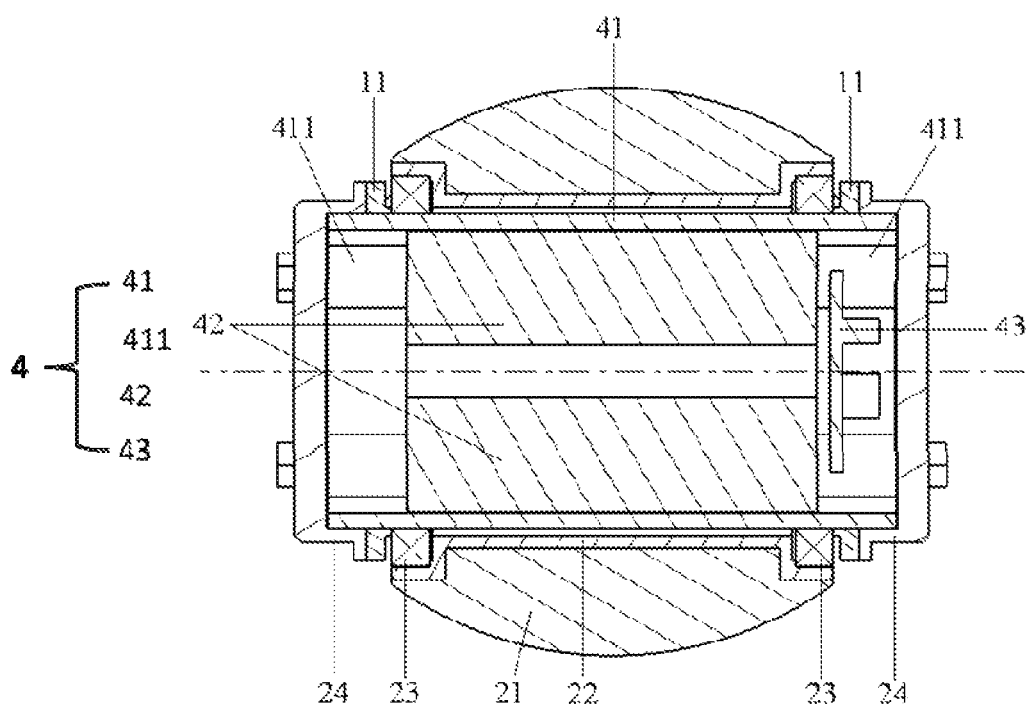
FIG. 4 is the sectional view of the wheel of the wearable motorized device shown in FIG. 2, which is provided with a driving motor.
Figure 5:
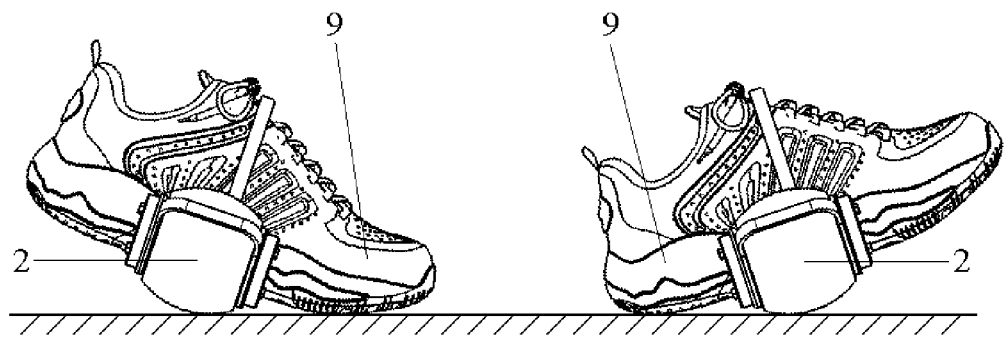
FIG. 5 is the schematic view of the wheel of the wearable motorized device shown in FIG. 2, which is in contact with the ground during walking.

FIG. 2 is the structural diagram of the wearable motorized device. FIG. 3 is the sectional view of the wheel of the wearable motorized device shown in FIG. 2, which is provided with the battery pack. FIG. 4 is the sectional view of the wheel of the wearable motorized device shown in FIG. 2, which is provided with the driving motor. FIG. 5 is the schematic view of the wheel of the wearable motorized device shown in FIG. 2, which is in contact with the ground during walking.

Referring to FIGS. 2, 3, and 4, the driving motor 3 is installed inside one of the wheels 2; the battery pack 4 is installed inside the other one of wheels 2. Through installation of the driving motor 3 and the battery pack 4 inside the wheels 2, the structure of the wheels 2 can be used to protect the driving motor 3 and the battery pack 4, which could be damaged easily if placed on the shoe bracket 1 externally.

The shoe bracket 1 comprises: the wheel brackets 11 for securing the wheels 2; the base plate 12 for supporting the shoe 9. The shoe bracket 1 can be integrally made of aluminum alloy, magnesium alloy, engineering plastic, carbon fiber or other materials, so as to provide sufficient rigidity and strength while reducing the weight as much as possible. As a wearable device, one of the primary objectives is to achieve lightweight, so as to minimize the burden and discomfort for the wearer.

The base plate 12 is provided with a shock pad 13 for absorption of vibration and shock. When the wearer skates on the uneven ground, or lands after jumping, the vibration and shock transmitted from the ground to the base plate 12 via the wheels 2 will be further transmitted to the bottom of the shoe 9, which causes discomfort for the wearer. For this reason, the shock pad 13 is provided, which may be made of rubber, foam plastic, or other shock absorbing materials to reduce the wearer's discomfort.

The shoe bracket 1 is provided with a strap 14, which is used to fasten the shoe bracket 1 onto the shoe 9. As a wearable device, the shoe bracket 1 shall be securely fastened onto the shoe 9, so that the device becomes an extension to the foot to enhance the wearer's mobility. Thus, the shoe bracket 1 can be provided with a single-point or multi-point strap 14 for fastening. Other ways which can be used to position and fasten the shoe bracket 1 to the shoe 9 are also possible and not limited by the foregoing description.

Referring to FIG. 3, the driving motor 3 comprises: a rotor 31, a stator 32, a first stator bracket 331, a second stator bracket 332 and a position sensor 34; the rotor 31 is installed on the radial outer side of the stator 32; the stator 32 is securely connected to the first stator bracket 331 and the second stator bracket 332; the first stator bracket 331 and the second stator bracket 332 are securely connected together by bolts.

The driving motor 3 can be an external-rotor motor to improve the torque density, and for the purpose of assembly, the stator bracket is divided into two pieces, which are fixed together by bolts. The driving motor 3 can also be an inner-rotor motor or any other suitable motor, such as axial flux motor, and its internal structure and arrangement can be selected depending on specific conditions and are not limited by the foregoing description.

The driving motor 3 further comprises an inverter 35. The inverter 35 is installed on the first stator bracket 331 or the second stator bracket 332. The inverter 35 can be embedded inside the driving motor 3 and placed near the stator 32 to simplify the electrical connection. The inverter 35 may also be placed on any other part of the shoe bracket 1 and is not limited by the foregoing description.

The wheel 2 comprises: a wheel rim 21, tire 22, bearing 23 and hub cover 24; the tire 22 is installed on the wheel rim 21, the rotor 31 is installed on the inner wall of the wheel rim 21; the bearing 23 is installed between the wheel rim 21 and the first stator bracket 331 or the second stator bracket 332.

The inner wall of the first stator bracket 331 and the second stator bracket 332 is provided with the first projecting lug 333, and the first stator bracket 331 and the second stator bracket 332 are securely connected to the wheel bracket 11 when the hub cover 24 is securely connected to the first projecting lug 333. The first stator bracket 331 and the second stator bracket 332 support not only the stator 12, but also the shaft of the wheel 2, and because of their relatively large diameter, they can provide greater rigidity to support the wheel 2.

Referring to FIG. 4, the battery pack 4 comprises: a cylinder 41 and battery 42, and the battery 42 is installed in the cylinder 41. The battery pack 4 can be composed of multiple batteries 42, which are connected in parallel or in series to obtain the required voltage and power. If lithium-ion batteries are used, the battery pack 4 also includes a battery protection board 43 to prevent the batteries 42 from overcharge or over-discharge.

The wheel 2 also comprises: a wheel rim 21, tire 22, bearing 23 and hub cover 24; the tire 22 is installed on the wheel rim 21; the bearing 23 is installed between the wheel rim 21 and the cylinder 41. The cylinder 41 of the battery pack 4 not only contains the battery 42, but also supports the shaft of the wheel 2, and because of its relatively large diameter, it can provide greater rigidity to support the wheel 2.

The inner wall of the cylinder 41 is provided with the second projecting lug 411, and the cylinder 41 is securely connected to the wheel bracket 11 when the hub cover 24 is securely connected to the second projecting lug 411. The combination of the hub cover 24 and the cylinder 41 not only encloses the battery 42 to form an enclosed battery pack 2, but also axially positions the wheel 2.

Referring to FIGS. 3 and 4, the section of the tire 22 is arc-shaped. The tire 22 can be made of rubber, polyurethane, or other suitable materials to provide an appropriate damping effect and sufficient abrasion resistance.

Referring to FIG. 5, the tire 22 with an arc-shaped section can be adapted to the wearer's longitudinal walking when the wearer's feet are in contact with the ground. The two wheels of the motorized device fastened onto the shoe and the ground contact area of the sole of the shoe 9 constitute an approximately triangular ground contact area, and the wheels 2 will not rotate due to shuffling, so that stable ground contact and support can be achieved.

Figure 6:
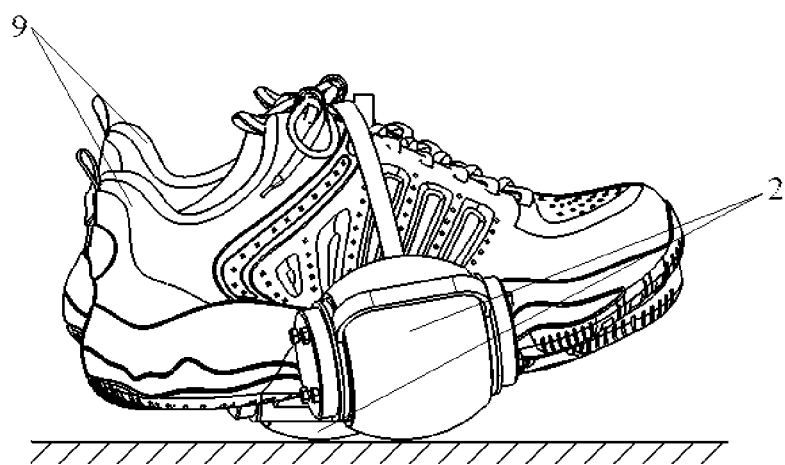
FIG. 6 is the schematic view of the wheel of the wearable motorized device shown in FIG. 2, which is in contact with the ground during skating direction change.

Referring to FIG. 6, the tire 22 with an arc-shaped section can also be adapted to the wearer's directional movements in which the wearer tilts his/her feet sideways during lateral skating. It is so that a relatively large ground contact area of the wheels 2 is assured during tilting, thereby providing adequate adhesion to avoid slippage of the wheels 2 when the driving motor 3 drives the wheels 2 to rotate.

In accordance to various embodiments, the two wheels 2 of each shoe bracket 1 can be of same in diameter; however, the present invention is not limited by the aforesaid design, and the two wheels 2 can also be different in diameter. For example, the diameter of the wheel 2 that is close to the outer side of the shoe 9 may be larger, so as to ensure mobility on uneven ground, whereas the diameter of the wheel 2 that is close to the inner side of the shoe 9 maybe smaller, and the sum of the diameter of the two wheels 9 that are close to the inner sides of the shoes 9 may be slightly smaller than the lateral distance between the inner sides of the feet during walking. It is so to avoid collision between the two wheels 2 and ensure the wearer's normal gait during walking.

In the wearable motorized device shown in FIG. 2, the wheels 2 are arranged to have a wide spacing on the left and right sides of the shoe bracket 1. The position of the base plate 12 of the shoe bracket 1 is relatively low, and the center-of-gravity position of the shoe 9 and the wearer is also relatively low; however, the present invention is not limited by the aforesaid design, and the wheels 2 may also be arranged to have a narrow spacing on the left and right sides of the shoe bracket 1.

Figure 7:
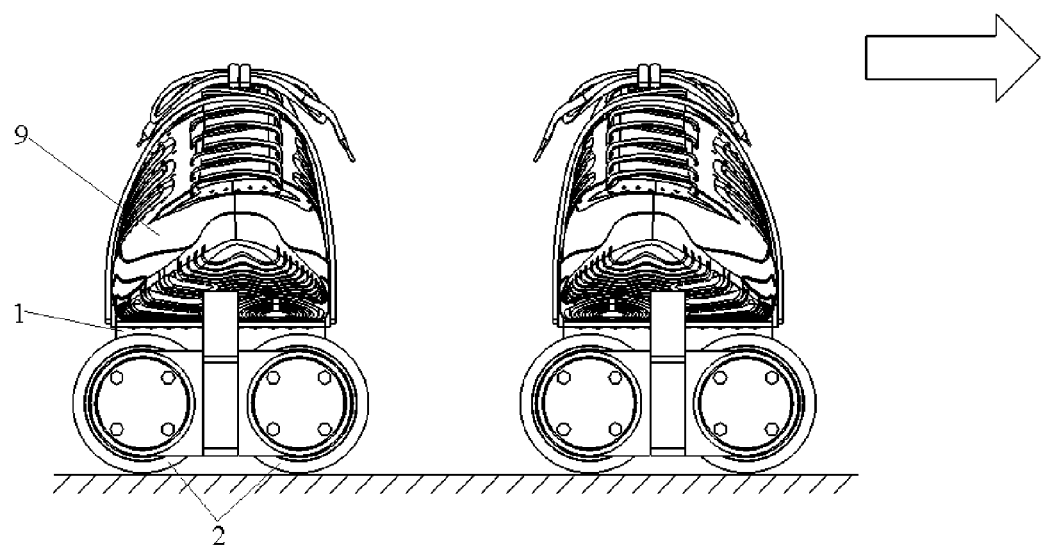
FIG. 7 is the schematic view of the overall structure of the wearable motorized device according to another one embodiment of the invention.

Referring to FIG. 7, the two wheels 2 are arranged with a narrow spacing at the bottom of the base plate 12 of the shoe bracket 1; although the center-of-gravity position of the shoe 9 and the wearer is relatively high, the wearer will have a higher line of sight and better skating sensation. In addition, the two wheels 2 on the inner sides will not collide with each other and affect the wearer's normal gait during walking even in case where they have relatively larger diameters.

Figure 8:
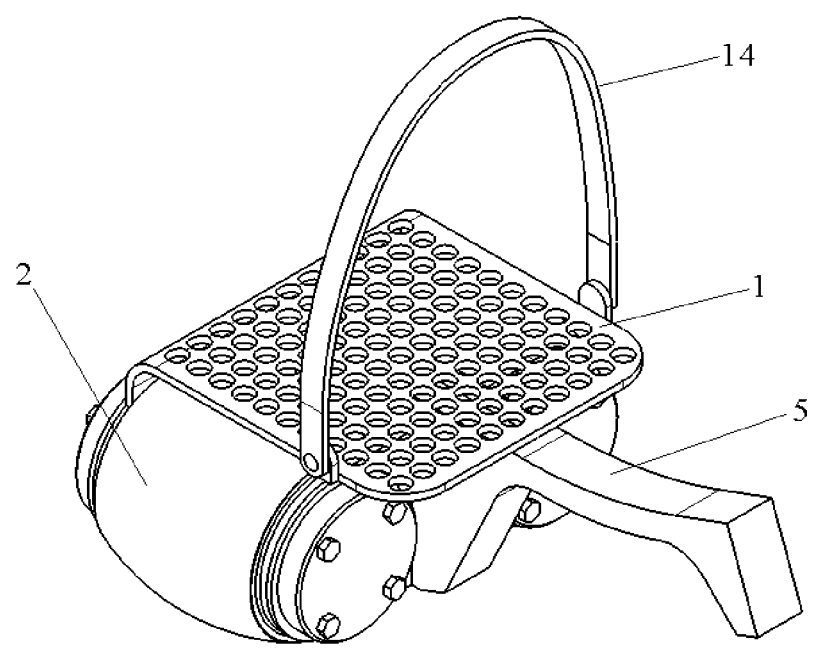
FIG. 8 is the structural diagram of the wearable motorized device shown in FIG. 7.
Figure 9:
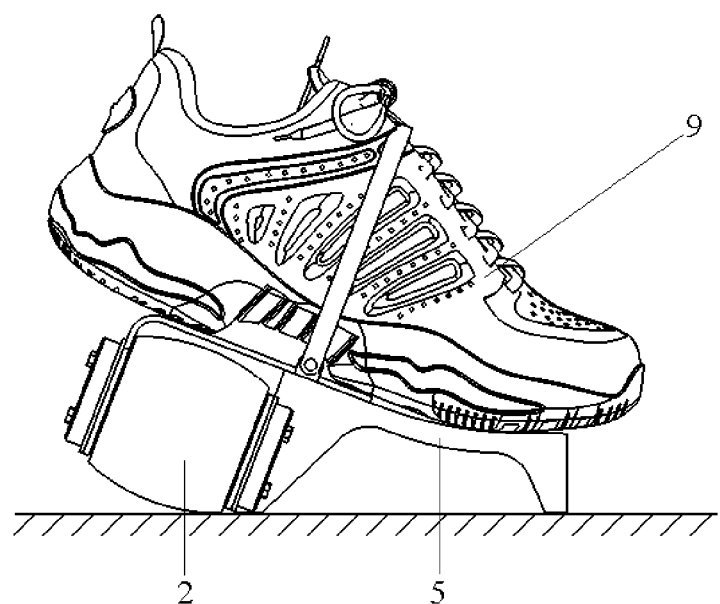
FIG. 9 is the schematic view of the wheel of the wearable motorized device shown in FIG. 7, which is in contact with the ground.

Referring to FIGS. 8 and 9, the front of the shoe bracket 1 is also provided with a front heel 5, which is connected to the shoe bracket 1 to assist the wearer in walking. As the position of the shoe 9 is relatively high, it is necessary to compensate the front sole to facilitate walking. For this purpose, the front heel 5 is used to increase the height of the front sole, so the wearer walks as if he/she is wearing high-heeled shoes or the likes. At the back of the shoe bracket 1, a space for accommodating a high heel can be reserved, so that a female wearer wearing high-heeled shoes with a proper heel height can also wear the wearable motorized device directly, without the need to first taking off her high-heeled shoes and putting on lower-heeled shoes.

The front heel 5 can be step-shaped and provides two support points one near the toe part of the shoe 9 and the other near the wheels 2, which together with the ground contact points of the wheels 2, can provide a stable support area for walking. The front heel 5 can be made of rubber or shoe sole material to ensure the comfort of the wearer when walking; however, the present invention is not limited by the aforesaid design. The front heel 5 can be made of rubber or shoe sole material, which can be integrated with the shoe rack 1 or separately provided and detachably connected to the shoe rack 1 by bolts, clasps, etc.

In addition, the front heel 5 can also be used to assist with initial starting. After putting on the motorized device, the wearer lifts his/her front soles to completely stand on the wheels 2, and then starts lateral skating. The front heel 5 can also be used to assist with braking. The wearer tilts his/her front soles forward to make the front heel 5 to make contact with the ground gradually, as such the friction between the front heel 5 and the ground can slow down the skating gradually until stop.

The aforesaid embodiments of the wearable motorized device can also be modified appropriately to obtain the following modified embodiments of the present invention:

In the second modified embodiment, the driving motor 3 is installed inside the wheel 2; the battery pack 4 is installed on the shoe bracket 1.

In the third modified embodiment, the driving motor 3 is installed on the shoe bracket 1; the battery pack 4 is installed on the shoe bracket 1.

In the forth modified embodiment, the driving motor 3 is installed inside the wheel 2; the battery pack 4 is worn on the wearer's body.

In the fifth modified embodiment, the driving motor 3 is installed on the shoe bracket 1, and the battery pack 4 is worn on the wearer's body. The driving motor 3 is installed on the shoe bracket 1 and drives the wheels through a drive mechanism, such as belt drive mechanism. Because no driving motor 3 is installed inside the wheel 2, the wheel diameter can be appropriately reduced to facilitate walking. The battery pack 4 is made in the form of packet worn on the wearer's body, such as waist or back, and connected to the driving motor 3 by wire for power supply. For this reason, a larger battery pack 4 may be used to increase the skating range, and because no battery pack 4 is installed inside the wheel 2, the wheel diameter can be appropriately reduced to facilitate walking.

In the sixth modified embodiment, both the driving motor 3 and the battery pack 4 are worn on the wearer's body. The wearable motorized device further comprises a flexible shaft, which is used to transfer the driving force of the driving motor 3 to the wheels 2. When the driving motor 3 and the battery pack 4 are worn on the wearer's body, the shoe bracket 1 is in the most maneuverable structure with the lightest weight, and the diameter of the wheel 2 can also be reduced to facilitate the wearer at the time of walking and ascending/descending stairs. In addition, larger driving motor 3 and battery pack 4 can also be provided to achieve higher skating speed and longer skating distance.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A wearable motorized device, comprising:
    a shoe bracket for fastening to a shoe;
    a plurality of wheels installed at the left and right sides of the shoe bracket in parallel to enable lateral skating and longitudinal walking;
    a driving motor, for rotationally driving the wheels; and
    a battery pack for powering the driving motor;
    wherein the driving motor is installed inside one of the wheels;
    wherein the driving motor comprises:
       a rotor,
       a stator having a radial outer side,
       a first stator bracket having an inner wall,
       a second stator bracket having an inner wall, and
       a position sensor; and
    wherein the rotor is installed on the radial outer side of the stator, the stator is fixed onto the first stator bracket and the second stator bracket, and the first stator bracket and the second stator bracket are connected together by bolts.

2. The wearable motorized device according to claim 1, wherein the battery pack is installed inside another one of the wheels.

3. The wearable motorized device according to claim 1, wherein the shoe bracket comprises:
    a plurality of wheel brackets, each wheel bracket for securing each of the wheels; and
    a base plate for supporting the shoe.

4. The wearable motorized device according to claim 3, wherein the base plate is provided with a shock pad for absorption of vibration and shock.

5. The wearable motorized device according to claim 1, wherein the shoe bracket is provided with a strap for fastening the shoe bracket to the shoe.

6. The wearable motorized device according to claim 1, wherein the driving motor comprises an inverter installed on the first stator bracket or the second stator bracket.

7. The wearable motorized device according to claim 6, wherein each of the wheels comprises:
    a wheel rim having an inner wall,
    a tire,
    a bearing, and
    a hub cover; and
    wherein the tire is installed on the wheel rim, the rotor is installed on the inner wall of the wheel rim, and the bearing is installed between the wheel rim and the first stator bracket or the second stator bracket.

8. The wearable motorized device according to claim 7, wherein the inner wall of the first stator bracket and the second stator bracket is provided with a first projecting lug; and
    wherein the first stator bracket and the second stator bracket are connected to the wheel bracket when the hub cover is connected to the first projecting lug.

9. The wearable motorized device according to claim 3, wherein the battery pack comprises:
    a cylinder having an inner wall, and
    a battery; and
    wherein the battery is installed in the cylinder.

10. The wearable motorized device according to claim 9, wherein each of the wheels comprises:
    a wheel rim,
    a tire,
    a bearing, and
    a hub cover; and
    wherein the tire is installed on the wheel rim, and the bearing is installed between the wheel rim and the cylinder.

11. The wearable motorized device according to claim 10, wherein the inner wall of the cylinder is provided with a second projecting lug; and
    wherein the cylinder is connected to the wheel bracket when the hub cover is connected to the second projecting lug.

12. The wearable motorized device according to claim 10, wherein a section of the tire is arc-shaped.

13. A wearable motorized device, comprising:
    a shoe bracket for fastening to a shoe;
    a plurality of wheels installed at the left and right sides of the shoe bracket in parallel to enable lateral skating and longitudinal walking;
    a driving motor, for rotationally driving the wheels; and
    a battery pack for powering the driving motor;
    wherein the battery pack is installed inside one of the wheels;
    wherein the shoe bracket comprises:
       a plurality of wheel brackets, each wheel bracket for securing each of the wheels; and
       a base plate for supporting the shoe;

wherein the battery pack comprises:
   a cylinder having an inner wall, and
   a battery;
wherein the battery is installed in the cylinder;
wherein each of the wheels comprises:
   a wheel rim,
   a tire,
   a bearing, and
   a hub cover;
wherein the tire is installed on the wheel rim, and the bearing is installed between the wheel rim and the cylinder;
wherein the inner wall of the cylinder is provided with a projecting lug; and
wherein the cylinder is connected to the wheel bracket when the hub cover is connected to the projecting lug.

14. The wearable motorized device according to claim 13, wherein the driving motor is installed inside another one of the wheels.

15. The wearable motorized device according to claim 13, wherein the base plate is provided with a shock pad for absorption of vibration and shock.

16. The wearable motorized device according to claim 13, wherein the shoe bracket is provided with a strap for fastening the shoe bracket to the shoe.

17. The wearable motorized device according to claim 13, wherein a section of the tire is arc-shaped.

* * * * *